(12) United States Patent
Henshaw

(10) Patent No.: US 8,209,837 B1
(45) Date of Patent: Jul. 3, 2012

(54) ROTARY MOWER BLADE REMOVAL AND REINSTALLATION DEVICE

(76) Inventor: George Henshaw, Hudson, OH (US)

(*) Notice: Subject to any disclaimer, the term of this patent is extended or adjusted under 35 U.S.C. 154(b) by 287 days.

(21) Appl. No.: 12/574,854

(22) Filed: Oct. 7, 2009

(51) Int. Cl.
| | | |
|---|---|---|
| *B23Q 1/00* | (2006.01) | |
| *B23Q 3/00* | (2006.01) | |
| *B23Q 7/04* | (2006.01) | |
| *B23P 19/04* | (2006.01) | |
| *A01D 34/00* | (2006.01) | |
| *A01D 67/00* | (2006.01) | |
| *B25B 27/00* | (2006.01) | |
| *B24B 19/00* | (2006.01) | |
| *B24D 11/00* | (2006.01) | |
| *A47L 5/00* | (2006.01) | |
| *A47L 9/00* | (2006.01) | |
| *B08B 5/00* | (2006.01) | |

(52) U.S. Cl. ............ 29/283; 29/281.1; 29/240; 56/17.4; 56/13.8; 56/320.2; 81/488; 451/423; 451/539; 15/339

(58) Field of Classification Search .................... 29/283, 29/281.1, 240; 56/17.4, 13.8, 320.2, 17.5, 56/255; 81/488; 451/423, 539, 419; 15/339
See application file for complete search history.

(56) References Cited

U.S. PATENT DOCUMENTS

| 2,084,799 | A | * | 6/1937 | Garris | 451/423 |
|---|---|---|---|---|---|
| 3,101,629 | A | * | 8/1963 | Koelndorfer | 76/82.1 |
| 3,173,234 | A | * | 3/1965 | Vodinelich | 56/320.2 |
| 3,242,660 | A | * | 3/1966 | Gary | 56/13.8 |
| 4,882,960 | A | * | 11/1989 | Kugler | 81/488 |
| 4,956,905 | A | * | 9/1990 | Davidson | 29/281.1 |
| D329,364 | S | * | 9/1992 | Schuerg et al. | D8/71 |
| 5,865,018 | A | * | 2/1999 | Wanie | 56/17.4 |
| 6,272,724 | B1 | * | 8/2001 | Sterling et al. | 29/281.1 |
| 6,715,194 | B1 | * | 4/2004 | Sterling et al. | 29/281.1 |
| 6,928,801 | B1 | * | 8/2005 | Papproth | 56/17.5 |

* cited by examiner

*Primary Examiner* — Lee D Wilson
*Assistant Examiner* — Alvin Grant

(57) ABSTRACT

A device constructed of a material strong enough to withstand the torque of a typical air wrench or cheater bar used by a lawn mower repair shop or a homeowner. One end of the device must have an opening and be of the size as to allow a lawn mower blade to be inserted inside of it. The portion containing the tip of the blade may include a leveler and/or retainer to raise the device to approximately the horizontal plane of the mower blade and the lower edge of the mower deck. The device includes a restriction leg to provide a prop against any protuberance on the side of a single-blade mower deck or on the side or within the deck on a multi-blade mower deck. To provide economics for manufacturing, one size should fit most blades and the device should require a limited quantity of materials and fabrication.

1 Claim, 6 Drawing Sheets

ROTARY MOWER BLADE REMOVAL AND REINSTALLATION DEVICE

BACKGROUND FIELD OF INVENTION

This invention relates to the removal and installation of lawn mower blades, specifically to produce devices to be placed upon or over lawn mower blades to assist in stopping rotation of said blades so they may be safely removed and/or installed.

For peak efficiency, lawn mower blades should be re-sharpened or replaced regularly. It is difficult at best and even dangerous to remove any blade retaining nut or bolt, especially so if the nut or bolt has been over-tightened or rusted in place. The problem is to lock the blade positively against rotation so the high torque necessary to loosen the blade retaining nut or bolt can be applied with a wrench. Holding the blade with a gloved hand does not guarantee enough leverage to loosen the nut especially because blades are routinely installed with a torque tightness of 60 to 120 foot pounds or more and may tend to tighten even more in use.

The typical device to assist users in this procedure that lawn mower manufacturers and their service technicians recommend is a block of wood wedged between the mower housing and the blade. While some commercial mower manufacturers may suggest an impact wrench to remove blades, blades must be re-installed with a hand torque wrench requiring an ability to jam the blade to prevent movement. Using a wood block may result in injury as the block is typically held in place either by gravity or pressure and tends to fall and allow the blade to rotate. This may result in skinned knuckles, cut hands or fingers, or the complete loss of the same. Further, with a mulching deck (which typically is a complete circular tunnel surrounding the blade) there is no place against which the block of wood can be jammed.

Technicians, while performing this process in factory trained shops, commonly use an air wrench to loosen or tighten the blade retaining bolts with one hand while holding the blade with the other. The primary protection for the hands is a rag over the blade or wearing a glove on the hand that holds the blade. This procedure may result in injury to the technician because it depends on their strength and balance to hold the blade steady while using torque of said air wrench. Often, the retaining bolt is frozen or the technician over tightens said retainer and cannot hold the blade. This injury is likely more severe because of the strength and speed of said air tool.

The problem is further compounded by the ground level location of the blade and it is only limitedly visible and accessible through the discharge chute (not present on mulching mowers) unless the mower is elevated using ramps or jacks, tilted backwardly or on its side, or turned upside down. As a practical matter, a heavy riding mower or commercial mower is generally not elevated on blocks just to remove the blades for sharpening. Instead, the mower deck is elevated as far as it will go, which will give about 5" of visibility and working space for a person lying or crouching on the ground.

BACKGROUND-DESCRIPTION OF PRIOR ARTS

Searches at the patent library revealed patent application US 2007/0266691 (Elliott et al) for a device that fits around a blade and functions by either jamming the blade against a discharge chute or jamming the blade within the mower deck (for multi-blade mowers). The device will not work with a mulching mower or multiple-blade mulching mower deck because the blade housing is circular and provides no surface against which to jam the blade. Further, because of the circular blade housing, it would not be possible to install the device over the blade.

Another patent application US 2001/0035077 (Adams) is for a complicated device which incorporates a wrench with the blade holder. This device requires significant raw material and significant fabrication likely rendering it cost-prohibitive to potential users.

Another patent application US 2001/0035080 (Adams) is for a device which requires the user to use one hand to control the tool and the other hand to utilize the wrench for removal or installation of the blade. Blades typically require substantially more force to remove than to install and riding mower blades can require 120 pounds of torque or more to install. This device, then, requires the user to exert 120 pounds or more force in one direction with the tool while exerting 120 pounds or more force in the opposite direction with the wrench. The operator will not have a free hand to stabilize the wrench on the blade retaining bolt or nut. This device requires significant raw material and significant fabrication likely rendering it cost-prohibitive to potential users.

U.S. Pat. No. 3,134,280 (Guderjan et al.) issued May 26, 1964 is for a device that fits over the blade and requires the user to place the user's hand under the mower deck and into the path of the blade. It would require significant personal strength as there is limited, if any, leverage advantage. This device requires the user to use one hand to control the tool and the other hand to utilize the wrench for removal or installation of the blade.

Blades typically require substantially more force to remove than to install and riding mower blades can require 120 pounds of torque to install. This device, then, requires the user to exert 120 pounds or more force in one direction with the tool while exerting 120 pounds or more force in the opposite direction with the wrench. The operator will also not have a free hand to stabilize the wrench on the blade retaining bolt. This device requires significant raw material and significant fabrication likely rendering it cost-prohibitive to potential users.

U.S. Pat. No. 3,173,234 (Vodinelich) issued Mar. 16, 1965 is for a device that locks the blade by friction and works on thin stamped mower decks without the now typical extra lip (FIG. 12) at the bottom. It is intended for use on single-blade mower decks so it would not be useful for multiple-blade decks typical of riding and commercial mowers. This device would likely require removing built-up grass and debris from the inside of the mower deck to provide sufficient clamping force. Significant fabrication is required likely rendering it cost-prohibitive to potential users.

U.S. Pat. No. 4,208,859 (Brockway) issued Jun. 24, 1980 is for a device that locks the blade by friction and works on thin stamped mower decks without the now typical extra lip at the bottom. Further, it would not work on most fabricated metal decks (FIG. 13) (as opposed to stamped decks) which are typically employed by manufacturers of commercial quality mowers. This device would likely require removing built-up grass and debris from the inside of the mower deck prior to use.

U.S. Pat. No. 4,564,991 (Taylor) issued Jan. 21, 1986 is for a special tool which works only if the mower is turned upside down; as a result it can be used only with very light weight lawn mowers. However, it is unsafe to turn any mower upside down without first draining the fuel tank because of the hazard of leaking fuel. The tool shown in that patent engages the mower blade between a pair of stop pins. It could not be used effectively in the limited visibility and accessibility conditions under a riding mower. The tool could fall off because of the open space between the stop pins.

U.S. Pat. No. 4,882,960 (Kugler) is for a device that fits over the blade and requires sufficient clearance between the blade and the mower deck for installation. That device relies upon a threaded locking mechanism to prevent the blade from rotating. That device is also intended only for single-blade mowing decks. This device would likely require removing built-up grass and debris from the inside of the mower deck to provide sufficient clamping force.

U.S. Pat. No. 4,956,905 (Davidson) issued Sep. 18, 1990 is for a tool which requires the user to use one hand to control the tool and the other hand to utilize the wrench for removal or installation of the blade. Blades typically require substantially more force to remove than to install and riding mower blades can require 120 pounds of torque to install. This device, then, requires the user to exert 120 pounds or more force in one direction with the tool while exerting 120 pounds or more force in the opposite direction with the wrench. The operator will also not have a free hand to stabilize the wrench on the blade retaining nut or bolt. This device requires significant raw material and significant fabrication likely rendering it cost-prohibitive to potential users.

U.S. Pat. No. 6,272,724 (Sterling et al.) issued on Aug. 14, 2001 is for a tool similar to U.S. Pat. No. 4,956,905 (above) which requires the user to use one hand to control the tool and the other hand to utilize the wrench for removal or installation of the blade. Blades typically require substantially more force to remove than to install and riding mower blades can require 120 pounds of torque to install. This device, then, requires the user to exert 120 pounds or more force in one direction with the tool while exerting 120 pounds or more force in the opposite direction with the wrench. The operator will also not have a free hand to stabilize the wrench on the blade retaining bolt. This device is apparently designed for single-blade mowing decks only.

U.S. Pat. No. 6,276,039 (Barnes) issued on Aug. 21, 2001 is for a clamping tool to block blade movement. It relies upon friction against the side of the deck and because of the configuration of the clamping plier-like device would require that a single-blade mower deck be turned on its side for sufficient room to install the device. Further, the required clamping force could de-form the thin gauge stamped steel mower deck found on many low-cost mowers. For a riding mower, it would require that the mower be elevated to provide sufficient room to install the device. This device would likely require removing built-up grass and debris from the inside of the mower deck to provide sufficient clamping force. This device requires significant raw material and significant fabrication likely rendering it cost-prohibitive to potential users.

U.S. Pat. No. 6,715,194 (Sterling et al.) issued on Apr. 6, 2004 is for a tool similar to U.S. Pat. No. 6,272,724 (above) which requires the user to use one hand to control the tool and the other hand to utilize the wrench for removal or installation of the blade. Blades typically require substantially more force to remove than to install and riding mower blades can require 120 pounds of torque to install. This device, then, requires the user to exert 120 pounds or more force in one direction with the tool while exerting 120 pounds or more force in the opposite direction with the wrench. The operator will also not have a free hand to stabilize the wrench on the blade retaining bolt. This device requires significant raw material and significant fabrication likely rendering it cost-prohibitive to potential users. This device is apparently designed for single-blade mowing decks only.

U.S. Pat. No. 6,925,787 (Bernston) issued on Aug. 9, 2005 is in some ways similar to U.S. Pat. No. 4,882,960 (above) and U.S. Pat. No. 6,928,801 (below) and is for a device that relies upon the friction of a threaded locking mechanism to prevent the blade from rotating. That device apparently is intended only for single-blade mower decks. Current mowers typically have an extra lip at the bottom which would preclude this device from working. Further, it would not work on most fabricated metal decks (as opposed to stamped decks) which are typically employed by manufacturers of commercial quality mowers. This device would likely require removing built-up grass and debris from the inside of the mower deck to provide sufficient clamping force.

U.S. Pat. No. 6,928,801 (Papproth) issued on Aug. 16, 2005 is in some ways similar to U.S. Pat. No. 4,882,960 (above) and is for a device that relies upon the friction of a threaded locking mechanism to prevent the blade from rotating. That device apparently is intended only for single-blade mower decks. This device would likely require removing built-up grass and debris from the inside of the mower deck to provide sufficient clamping force.

Other tools for working on lawn mower blades can be seen in the Greenquist U.S. Pat. No. 4,736,544, for a blade holder for sharpening lawn mower blades in which the blade is sharpened while still attached to the mower and in the Wanie U.S. Pat. No. 5,865,018 for a cutter blade removal tool which slips onto the end of the blade and protrudes into the discharge chute of the cowling (and by design would be incapable of being used in a mulching mower deck), the Tyler U.S. Pat. No. 7,152,326 which is a device for manually holding a blade (and by design would be incapable of being used in a mulching mower deck). The Williams U.S. Pat. No. 6,634,161 is for a specialized blade rather than a device which will work with existing mower blades.

While all of the above devices may fulfill their respective particular objectives, they all have limitations ranging from limited application to difficulty to use to expensive fabrication. The subject device is therefore unique in that it:

(a) will work on any mower deck containing one or more blades;
(b) will work on mulching mower decks;
(c) does not require that single-blade mowers be placed upon their side thereby eliminating the time and trouble of first draining the gas tank and reducing the opportunity for oil to leak out of the engine or alternately drain into the combustion chamber;
(d) does not require the time and effort to elevate riding or commercial mowers;
(e) eliminates the expense of lifts or ramps to elevate riding or commercial mowers;
(f) does not rely on the ability of a locking device to provide sufficient friction to perform;
(g) does not require the removal of built-up grass clippings and other debris prior to use;
(h) does not rely on the need to jam the blade against a flat area or discharge chute;
(i) does not rely on the user to hold blade stop device with one hand and wrench with other hand;
(j) enables user to employ both hands on wrench: one to hold wrench and the other to stabilize wrench; and
(k) can be fabricated in multiple fashions reducing fabrication cost. Other devices cited above require multiple fabrication steps and multiple parts whereas the subject could possibly be fabricated in as little as one process with stamping or molding manufacturing techniques.

SUMMARY

Accordingly, the need for a device to safely stop the rotation of a rotary mower blade during removal and installation has existed since the rotary mower was invented. Several advantages of this invention are as follows:

(a) to provide a device that allows a safer procedure than the current available devices for the removal and installation of rotary mower blades;
(b) to provide a device for said procedure that novices can easily use;
(c) to provide a device that is fast enough and easy enough for said procedures that professionals will use them;
(d) to provide a device that requires no adjustment to accommodate multiple blade widths and lengths;
(e) to provide a device for said procedure that is inexpensive to manufacture;
(f) to provide a device that secures mower blades in a manner that the manufacturer's torque specification on the retainer bolt or nut may be accurately obtained;

Still further objects and advantages will become apparent from the drawings and descriptions.

The invention is based on a particular device for the use of removal and installation of lawn mower blades. The device is designed to fit over a lawn mower blade acting as a stop to blade rotation. This allows the device to rotate with the blade until it encounters a barrier on the mower deck ranging from a wheel (which is present on all single-blade rotary mowers and on many multiple-blade mower decks) to any other protuberance on the mower deck thus stopping the rotation of said blade when torque is applied to remove or install the blade

DRAWINGS

Figures

In the drawings, corresponding numbers represent the same item or closely related items.

Figure 8:
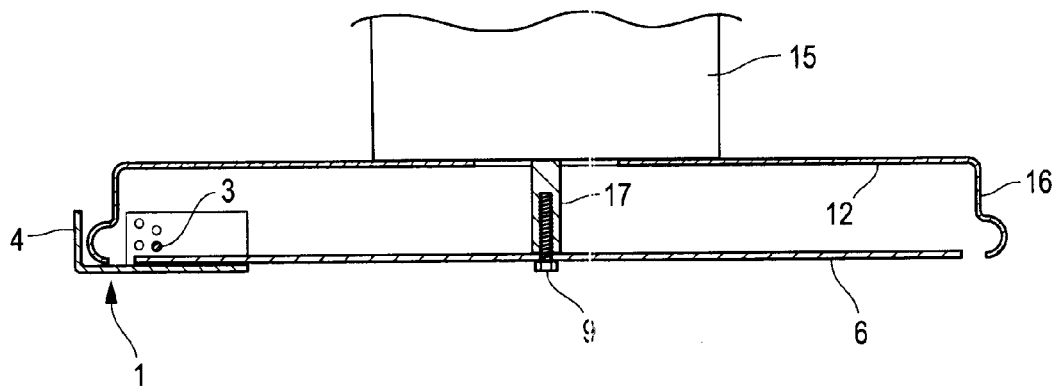

FIG. 8 shows the side view (16) of a single-blade mower deck (12) with blade mounting shaft (17) attached to engine (15) and protruding through top of deck to blade (6) which is attached with bolt (9). The device (1) is shown installed on the blade (6) and the restriction leg of the device (4) located outside the deck (12) in a position to bear against a wheel mount or any other protuberance on the outside of the deck.

Figure 9:
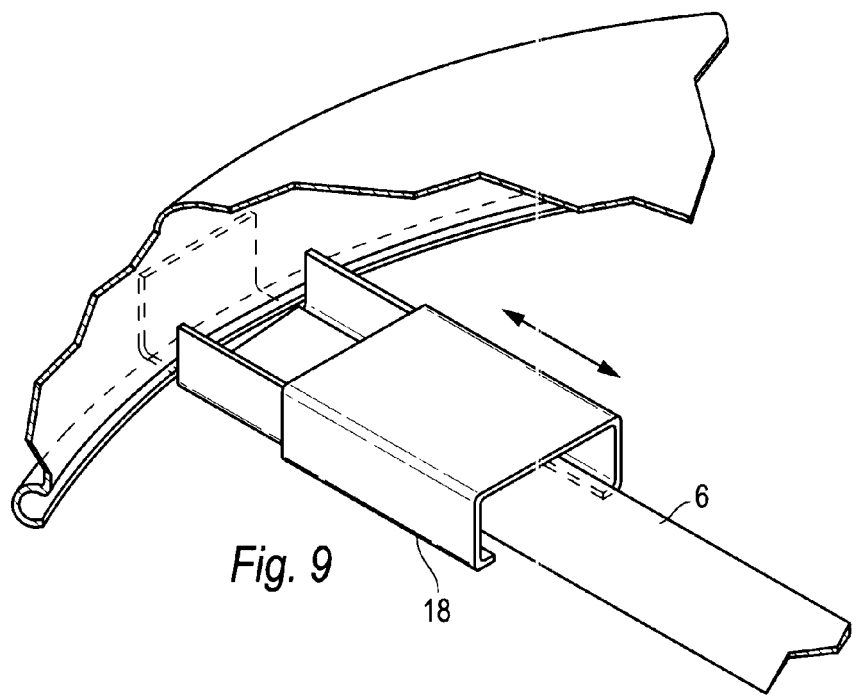

FIG. 9 shows an alternate embodiment of a device retainer sleeve (18) to be used instead of optional adjuster bolt (3) or adjuster pin (3a).

Figure 10:
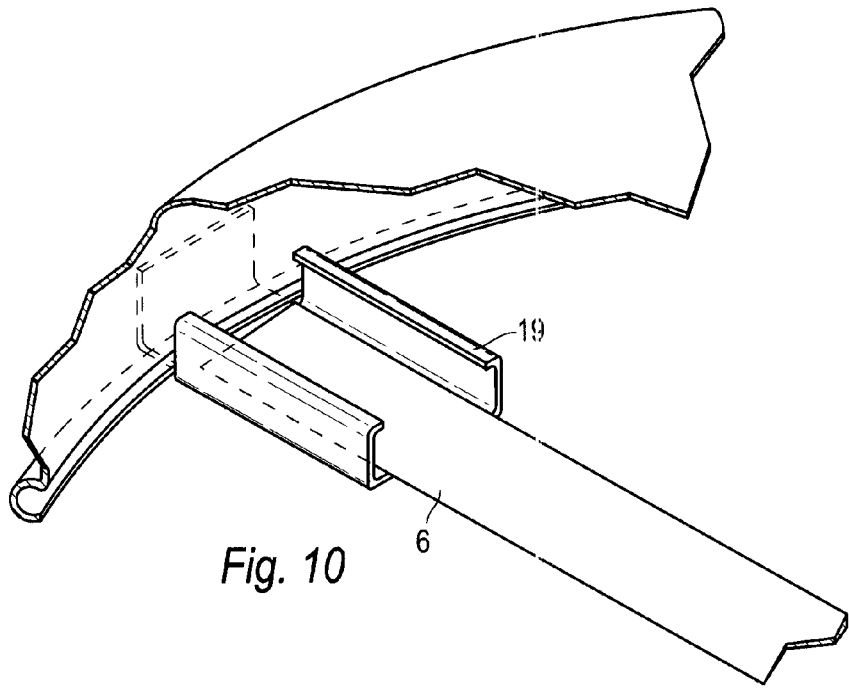

FIG. 10 shows an alternate embodiment of a lip retainer (19) to be used instead of optional adjuster bolt (3) or adjuster pin (3a) or when device is hand-held.

Figure 11:
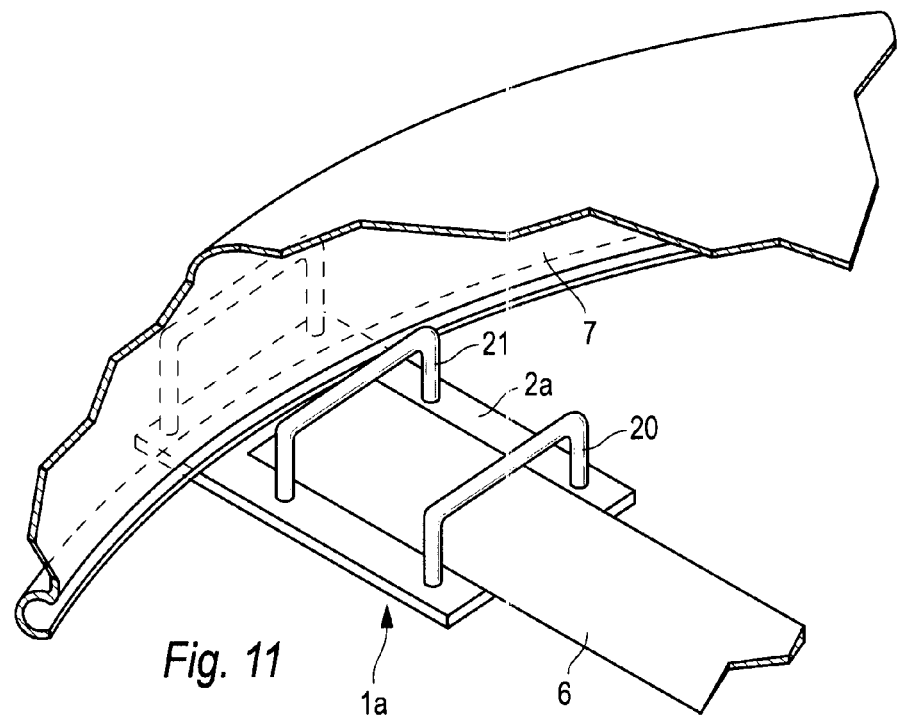

FIG. 11 shows an alternate embodiment which is self-retaining. Loop retainer 1 (20) is inserted at an angle with loop retainer 1 (20) enclosing the blade end (6) and the retainer located between the blade (6) and the underside of the mower deck (12). Similarly loop retainer 2 (21) is inserted at an angle. The restriction leg to stop blade rotation is then located outside the mower deck. This embodiment can be constructed by casting, or by loops welded to a plate, or by loops bolted to a plate (for possible final assembly by the purchaser thus minimizing fabrication costs), or by stamping from metal sheet.

Figure 12:
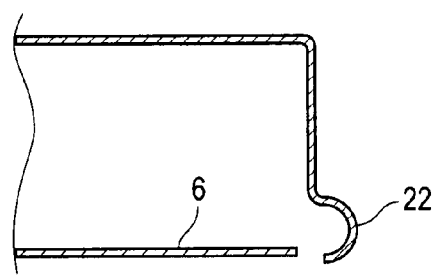

FIG. 12 shows a cross-section of a typical single-blade stamped metal mower deck.

Figure 13:
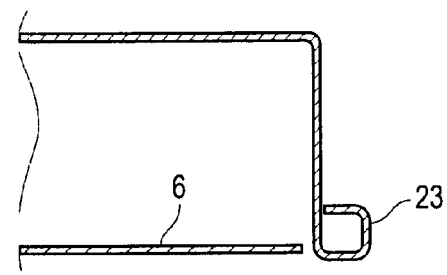

FIG. 13 shows a cross section of a typical fabricated metal mower deck commonly employed on commercial quality mowers.

DRAWINGS-REFERENCE NUMERALS

| | |
|---|---|
| 1 | Device |
| 1a | Device alternate |
| 2 | Area for receiving blade |
| 2a | Area for receiving blade alternate device |
| 3 | Blade holder/adjuster bolt |
| 3a | Blade holder/adjuster pin |
| 4 | Leg to restrict blade rotation |
| 4a | Leg to restrict blade rotation |
| 5 | Wing nut |
| 5a | Clip |
| 6 | Blade |
| 6a | Second blade on multiple blade mower deck |
| 6b | Third blade on multiple blade mower deck |
| 7 | Outside of mower deck |
| 8 | Blade grass lifting wing |
| 9 | Blade bolt |
| 10 | Wrench |
| 11 | Mower wheel mount |
| 12 | Underside of single-blade mower deck |
| 13 | Underside of multi-blade mower deck |
| 14 | Blade baffle multi-blade mower deck |
| 15 | Engine |
| 16 | Side view single-blade mower deck |
| 17 | Blade mounting shaft |
| 18 | Device retainer sleeve |
| 19 | Lip retainer |
| 20 | Loop retainer 1 |
| 21 | Loop retainer 2 |
| 22 | Lip on side of typical single-blade stamped metal mower deck |
| 23 | Edge on side of a typical fabricated metal mower deck commonly employed on commercial quality mowers. |

DETAILED DESCRIPTION OF THE PREFERRED EMBODIMENTS

Figure 1:
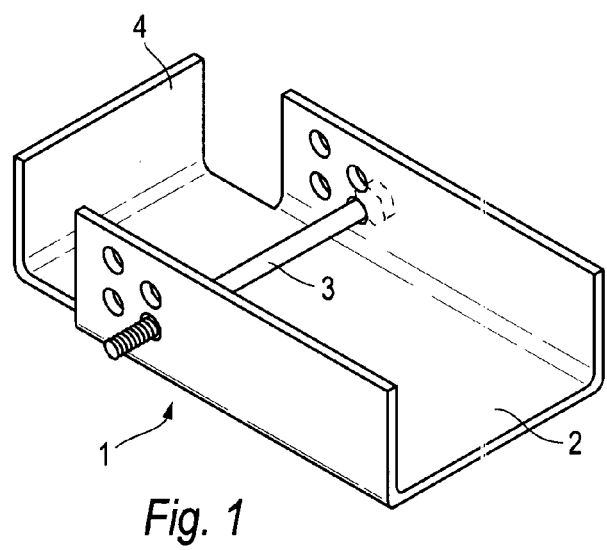
FIG. 1 shows the perspective view of the inventive device in which 1 shows the shape to be rectangular. 2 shows the area for receiving the blade. 3 shows the optional holder and adjuster for blade depth, and 4 is a prop or leg to restrict blade rotation by lodging against a mower deck protuberance.
Figure 2:
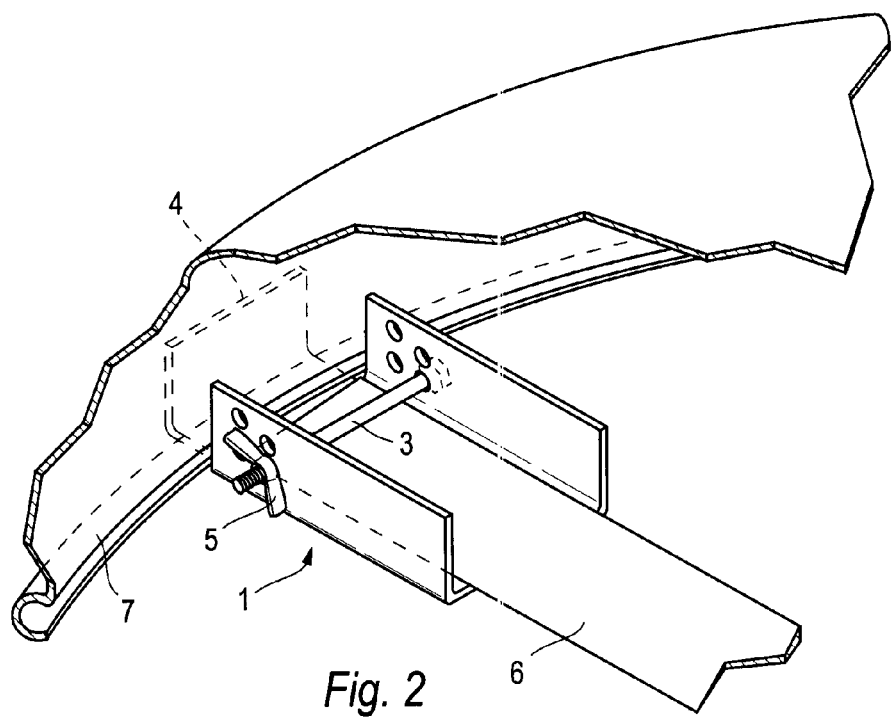
FIG. 2 shows the device (1) with the blade (6) inserted, retained by the optional threaded bolt holder (3) and optional wing nut (5) with the device located with the restriction leg (4) located outside mower deck side (7).
Figure 3:
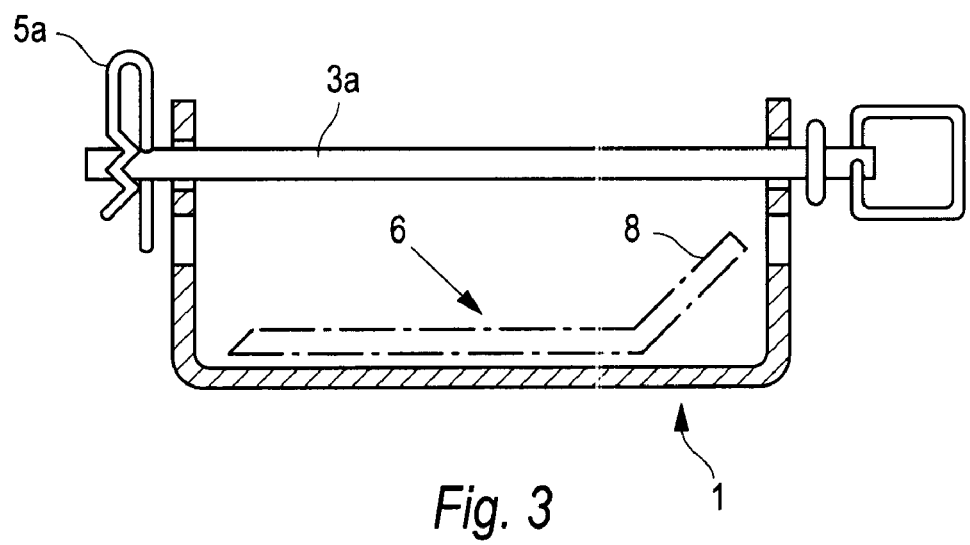
FIG. 3 shows the device (1) with the blade (6) inserted and the optional holder and adjuster for blade depth (3a) being a pin and (5a) clip instead of the threaded bolt option (3) and wing nut (5). Other devices as simple as a bendable wire could also be used in place of 5 and 5a and their retaining nut (5) or clip (5a).
Figure 4:
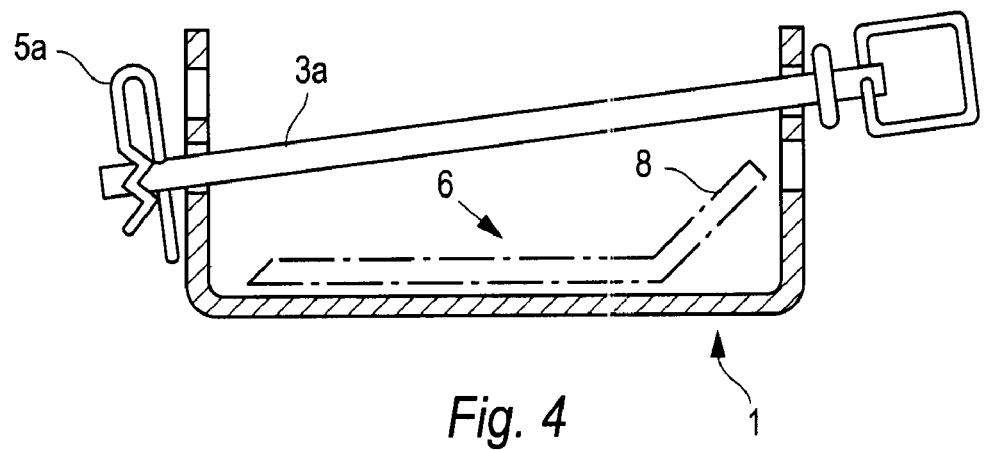
FIG. 4 shows the device (1) with the blade (6) inserted and the optional holder and adjuster for blade depth (3a) installed at an angle to compensate for the grass lifting wing (8) on the blade (6).
Figure 5:
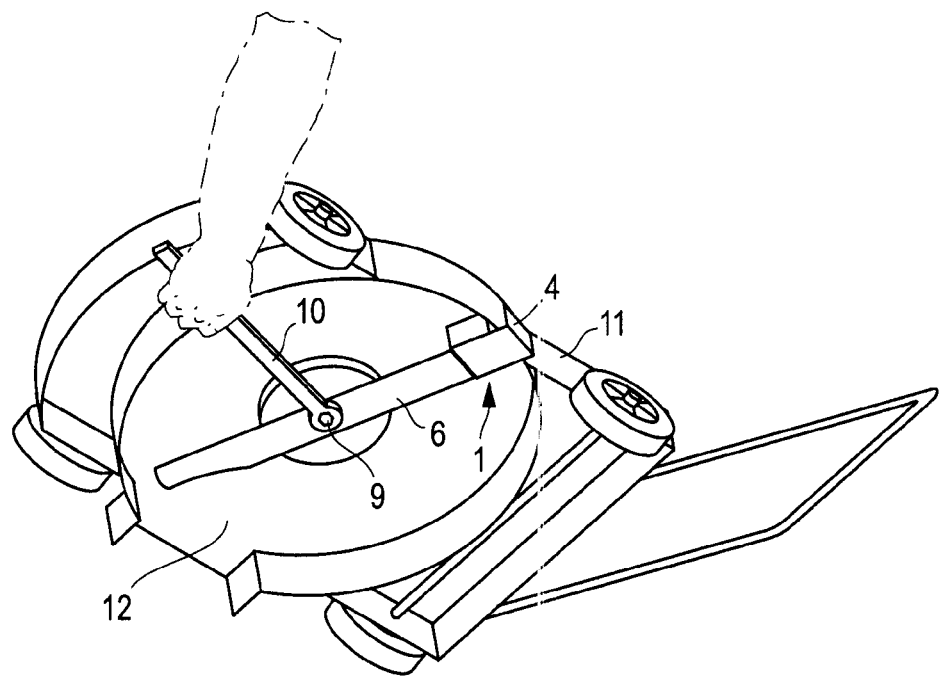
FIG. 5 shows the underside of a single-blade mower deck (12) and the device (1) with the blade (6) inserted and restrained by the restriction leg (4) pressing against the protruding mower wheel mount (11) with a wrench (10) applying a tightening force to the blade's bolt (9).
Figure 6:
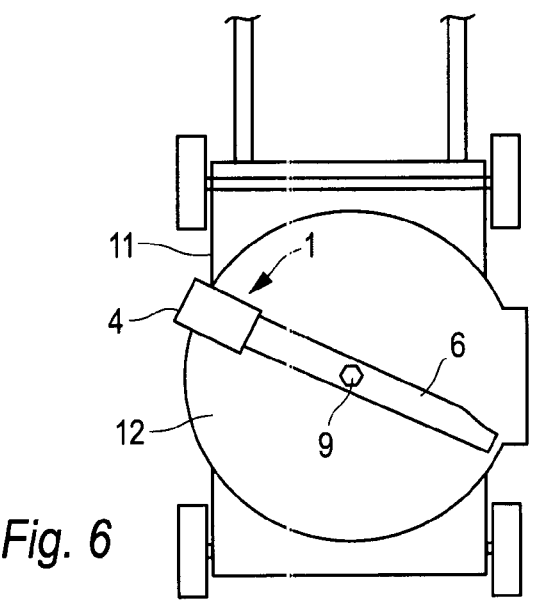
FIG. 6 shows the underside of a single-blade mower deck (12) and the device (1) with the blade (6) inserted and restrained by the restriction leg (4) pressing against the protruding mower wheel mount (11) and the blade's bolt (9).
Figure 7:
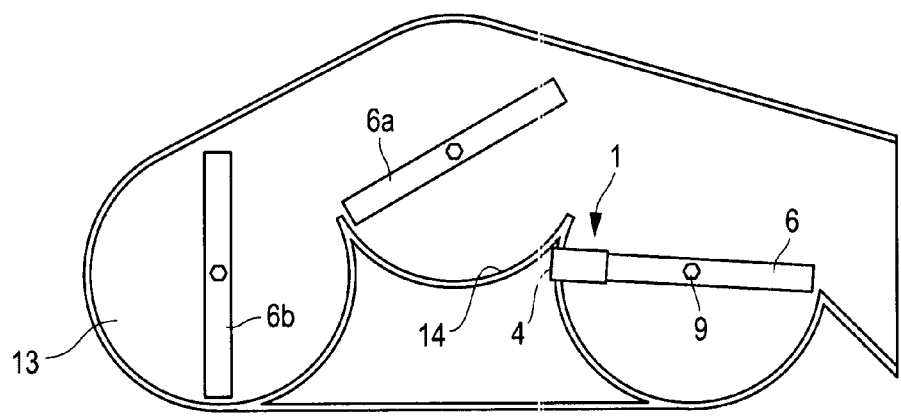
FIG. 7 shows a the underside of a multiple-blade mower deck (13) and the device (1) with the blade (6) inserted and restrained by the restriction leg (4) pressing against the protruding blade baffle for the center blade (14) and the blade's bolt (9). In a similar fashion the device could be installed on blades (6a) and (6b) and press against adjoining restrictions.

This device is constructed of steel or aluminum or composite or any other material sufficiently strong. It can be constructed of one piece of material formed by stamping bending or any similar method. It can also be constructed of pre-formed rectangular tubing with one side removed and the exterior restriction leg formed by bending. It can also be constructed of multiple angles cut to size and attached together such as by welding. It can also be constructed by casting in a mold. It can be retained on the blade solely by holding with one hand. Alternately, it can be retained on the blade with any of a number of pinning devices ranging from a toggle pin to a bolt to a bolt and nut to a pin with retaining clip. It can also be retained by a secondary "C" shaped retainer (18) which is slid over the device's open side (FIG. 9). For embodiments utilizing a pinning method, the device may have holes drilled, molded or punched completely through said tubing to allow a pin or shaft 3 (FIG. 1) to be inserted allowing it to serve as a retainer. For embodiments not utilizing a retainer (the device would be hand held) an optional lip (19) (FIG. 10) could be employed or the self-retaining embodiment (FIG. 11) could be utilized.

The device can be manufactured of any material so far as it is strong enough to withstand the repeated torque of wrenches and cheater bars.

Operation

The manner of using this device is to first follow the manufacturer's recommendations (such as remove spark plug wire) before trying to remove the mower blade (6). If this is a single-blade mower and manufacturer recommends turning mower over or on its side, this can be done. At this point, the device (1) or (1*a*) would be placed over or upon mower blade (6) by sliding it over said blade allowing the stopping edge to be installed on the outside edge of the mower deck. A retaining bolt (3) or pin (3*a*) could be installed at this point or the tool could be hand-held in place. Now the blade can be loosened by first rotating it until the device is solidly against a protuberance on the mower deck such as a wheel mount. At this time as much torque as needed may be applied to loosen blade retaining nut or bolt (9).

To re-install blade, simply turn said blade (6) and this device (1) the opposite direction as it was in taking it off. Allow device to again rotate slowly and strike mower deck protuberance securely. Now the recommended torque may be applied to tighten blade retaining nut or bolt (9).

CONCLUSIONS, RAMIFICATIONS AND SCOPE

Thus the reader will see that at least one embodiment of the device provides an easier-to-manufacture product that can be used on almost any type of rotary mower deck containing one or more blades allowing persons of almost any skill level to safely remove and reinstall mower blades to manufacturer recommended torque levels.

While my above description contains many specificities, these should not be construed as limitations on the scope, but rather as an exemplification of several embodiments thereof. Many other variations are possible. For example, a device could be constructed utilizing U-bolts to retain a blade. Accordingly, the scope should be determined not by the embodiments illustrated, but by the appended claims and their legal equivalents.

The invention claimed is:

1. A tool for locking and removing of a rotary blade of a power lawn mower having a standard deck said tool needing no movable adjustment parts to install on said power lawn mower and being comprised of:
   a one piece member consisting of
   a first flat surface having a front, back and two sides upon which the blade is held,
   a second flat surface integral and perpendicular to the front of said first flat surface for lodging against a protuberance on the mower deck,
   third and fourth flat surfaces integral and perpendicular to said sides of said first flat surface for retaining said blade from rotation,
   said third and fourth flat surfaces having holes therein to accept blade retaining means when said tool is installed on said mower, said second surface is located on the outside surface of said deck and said third and fourth flat surfaces are located on the interior of said deck so that when said second flat surface engages the protuberance on said deck said blade is locked in place so that the removal of said blade can be accomplished.

* * * * *